United States Patent
Olson et al.

(10) Patent No.: US 6,330,235 B1
(45) Date of Patent: *Dec. 11, 2001

(54) METHOD AND APPARATUS PROVIDING DATA COMMUNICATION OVER AN EXISTING TELEPHONE NETWORK WITHOUT INTERFERING WITH NORMAL TELEPHONY FUNCTIONS

(75) Inventors: Peter D. Olson, Los Gatos; Kevin P. Grundy, Fremont, both of CA (US); John K. Seamons, Basalt, CO (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,646

(22) Filed: Nov. 24, 1997

(51) Int. Cl.[7] .................................................. H04L 12/66
(52) U.S. Cl. ....................................... 370/353; 379/93.09
(58) Field of Search ................................ 370/352, 353, 370/354, 355, 356, 465, 493, 494, 495, 522, 525, 526, 527, 529, 389; 389/93.05, 88.17, 93.09, 100.15, 100.16, 93.31, 93.32, 93.28

(56) References Cited

U.S. PATENT DOCUMENTS

| | | |
|---|---|---|
| 4,291,200 | 9/1981 | Smith . |
| 4,596,021 | 6/1986 | Carter et al. . |
| 4,995,074 * | 2/1991 | Goldman et al. .................. 379/93.35 |
| 5,022,071 | 6/1991 | Mozer et al. . |
| 5,444,770 * | 8/1995 | Davis et al. ....................... 379/93.09 |
| 5,488,654 | 1/1996 | Oliver . |
| 5,493,609 * | 2/1996 | Winseck, Jr. et al. ................. 379/96 |
| 5,519,767 | 5/1996 | O'Horo et al. . |
| 5,625,677 * | 4/1997 | Feiertag et al. ....................... 370/493 |
| 5,625,679 * | 4/1997 | Gutzmer ............................. 379/93.37 |
| 5,668,857 | 9/1997 | McHale . |
| 5,815,503 * | 9/1998 | Li ......................................... 370/471 |
| 5,838,665 * | 11/1998 | Kahn et al. ........................... 370/260 |
| 5,841,840 * | 11/1998 | Smith et al. ....................... 379/93.01 |
| 5,878,120 * | 3/1999 | O'Mahony ......................... 379/93.09 |
| 5,901,202 * | 5/1999 | Lam ....................................... 379/22 |
| 5,946,304 * | 8/1999 | Chapman et al. .................... 370/276 |
| 6,091,722 * | 7/2000 | Russell et al. ....................... 370/352 |

OTHER PUBLICATIONS

Richardson, Clee: Data–With–Voice Gives Telco New Revenues, *Telephone Engineer & Management*, vol. 88, No. 9, pp. 121–122, May 1, 1984.

Feltman, Charles: A Free Ride for Data (Using Data/Voice Multiplexers), *LAN Magazine*, vol. 9, No. 4, p. 67 (7), Apr. 1994.

* cited by examiner

*Primary Examiner*—Wellington Chin
*Assistant Examiner*—Kwang B. Yao
(74) *Attorney, Agent, or Firm*—Pennie & Edmonds LLP (57) ABSTRACT

A method and an apparatus for providing data communications over the existing telephone network without burdening the public switched telephone network (PSTN) switch with data communications traffic. In one embodiment, a novel modem is coupled to both ends of the twisted pair telephone wire which runs between a remote location and the Central Office (CO) or the remote CO. An off-hook detector is also connected to the twisted pair line in order to enable detection of when normal telephony functions are being performed over the twisted pair line. The modems of the present invention are capable of transmitting data whenever normal telephony functions are not being performed, such as for example when the telephone line is on-hook. The data transmission in accordance with the teachings of the present invention uses sufficiently low current levels such that the PSTN switch located at the CO does not detect any activity on the twisted pair line.

22 Claims, 8 Drawing Sheets

METHOD AND APPARATUS PROVIDING DATA COMMUNICATION OVER AN EXISTING TELEPHONE NETWORK WITHOUT INTERFERING WITH NORMAL TELEPHONY FUNCTIONS

BACKGROUND OF THE INVENTION

1. Field of the Invention

The present invention relates generally to the field of communication systems and, more particularly, to data communications over a telephone network.

2. Background Information

Land based telephone systems have been in existence for many years. Existing telephone networks use twisted pair copper telephone wire to connect telephones and other equipment to a centralized Public Switched Telephone Network (PSTN) switch located at a Central Office (CO) or remote CO providing connectivity to other telephones or equipment. Up until recently, the predominant use of the twisted pair wire connecting telephones to the PSTN switch has been for traditional telephony functions such as for example voice conversation using a Plain Old Telephone Service (POTS) telephone call. With the advent of Internet and the World Wide Web, the twisted pair wires in existing telephone networks have begun carrying increasing amounts of digitized data for extended periods of time.

Figure 1:
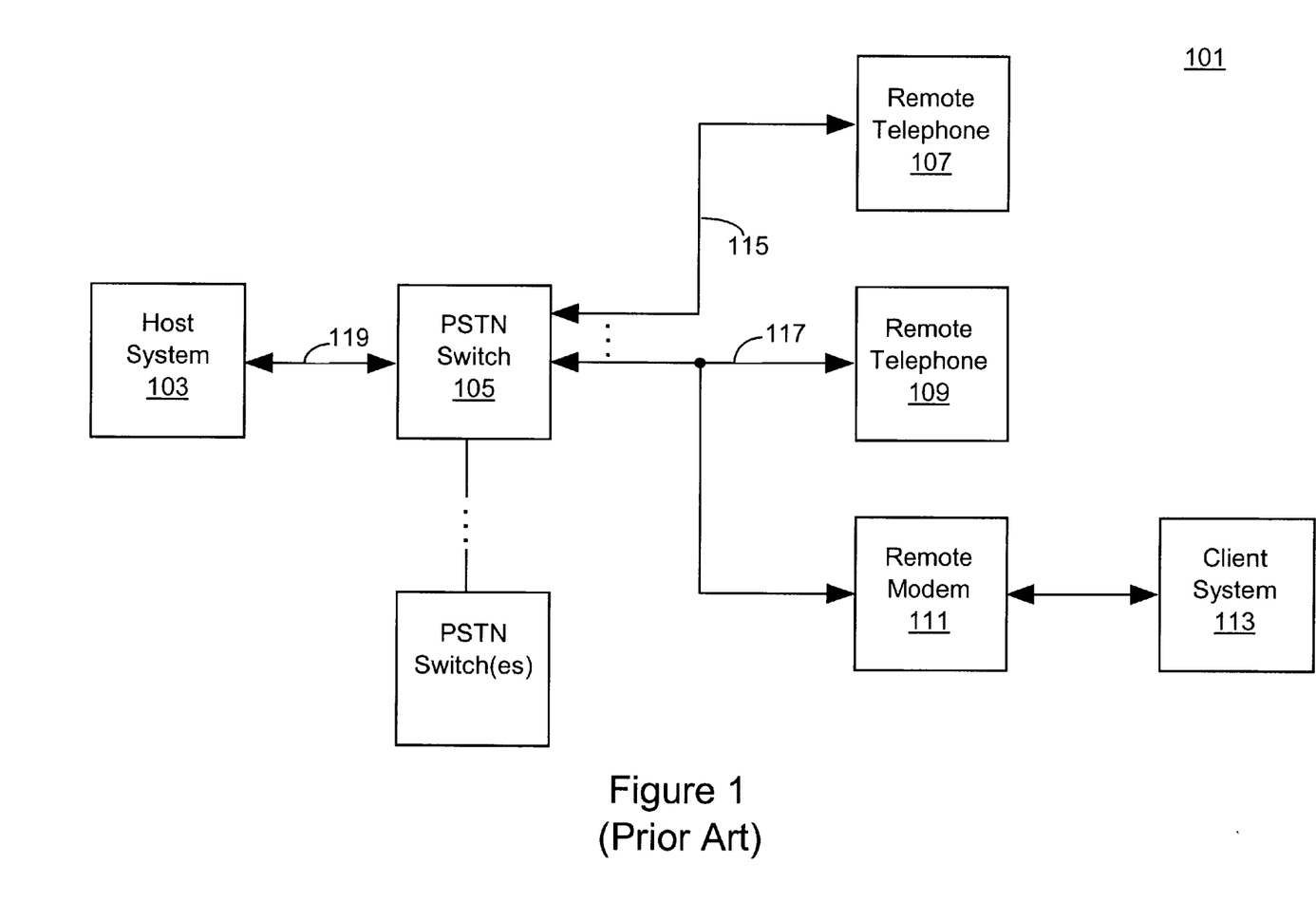
FIG. 1 is a block diagram of a prior art telecommunications system with a PSTN switch that is burdened with data communications traffic between a host system and a client system.

To illustrate, FIG. 1 shows a prior art telephone network 101 including a PSTN switch 105 providing connectivity to a plurality of telephones, such as remote telephones 107 and 109. As can be appreciated to those skilled in the art, PSTN switch 105 may be any one of a plurality of PSTN switches coupled together in a PSTN. Remote telephone 107 is coupled to PSTN switch 105 through twisted pair wire 115. Remote telephone 109 is coupled to PSTN switch 105 through twisted pair wire 117. During typical telephony operation, remote telephone 107 can communicate with remote telephone 109 through twisted pair wire 115, PSTN switch 105 and twisted pair wires 117 or to any other telephone in the PSTN.

As discussed, there is an increasing demand for telephone network 101 to carry digital information over the existing twisted pair wires to allow remote computer systems, such as for example client system 113, to communicate other systems, such as for example Internet Service Providers (ISPs), which may be represented as host system 103 in FIG. 1. Client system 113 is coupled to twisted pair wire 117 through remote modem 111. Host system 103 is typically coupled to PSTN switch 105 through a high speed data interface 119. Accordingly, data communications are provided between host system 103 and client system 113 through PSTN switch 105, twisted pair wire 117 and remote modem 111.

This continuing trend of using existing telephone networks for data communications has created some concern for the operators of the PSTN since virtually all of their switching equipment was initially intended to carry only short duration voice calls. Indeed, many PSTN switches are carrying more communications traffic volume than which they were originally designed.

In view of the foregoing, what is desired is a method and apparatus that permits data communications at high data rates over existing twisted pair wires of existing telephone networks without burdening the PSTN switches. Furthermore, such a method and apparatus should be able to be coupled to existing PSTN twisted pair wires with little or no modification and without interfering with normal telephony functions.

SUMMARY OF THE INVENTION

A method and apparatus permitting data communications at high data rates over an existing telephone network without interfering with normal telephony functions is disclosed. In one embodiment, a telecommunications system is described, which includes a concentrator coupled between a host system and a telephone line of a PSTN switch. The telephone line couples together the PSTN switch and a remote telephone such that the concentrator is coupled to the telephone line between the PSTN switch and the remote telephone. A remote modem is coupled between a client system and the telephone line such that data communications may be established between the host system and the client system over the telephone line through the concentrator. The data communications between the host and client systems bypass the PSTN switch and occur during an on-hook condition on the telephone line. A detection circuit is coupled to the telephone line and detects when there is an on-hook to off-hook transition on the telephone line. If so, data communications between the host and client systems are suspended, thus enabling normal telephony functions to occur during the off-hook condition on the telephone line. Once the telephone line returns to an on-hook condition, the suspended data communications between the host system and the client system are resumed.

BRIEF DESCRIPTION OF THE DRAWINGS

The present invention is illustrated by way of example and not limitation in the accompanying figures.

DETAILED DESCRIPTION

A method and an apparatus providing data communications between a host system and a client system over an existing telephone network without burdening the PSTN switch with data communications traffic is disclosed. In the following description, numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention. While the diagrams representing embodiments of the present invention are illustrated in FIGS. 2–8, these illustrations are not intended to limit the invention. The specific steps described herein are only meant to clarify an understanding of the present invention and to illustrate embodiments of how the present invention may be implemented in order to achieve a desired result.

Figure 2:
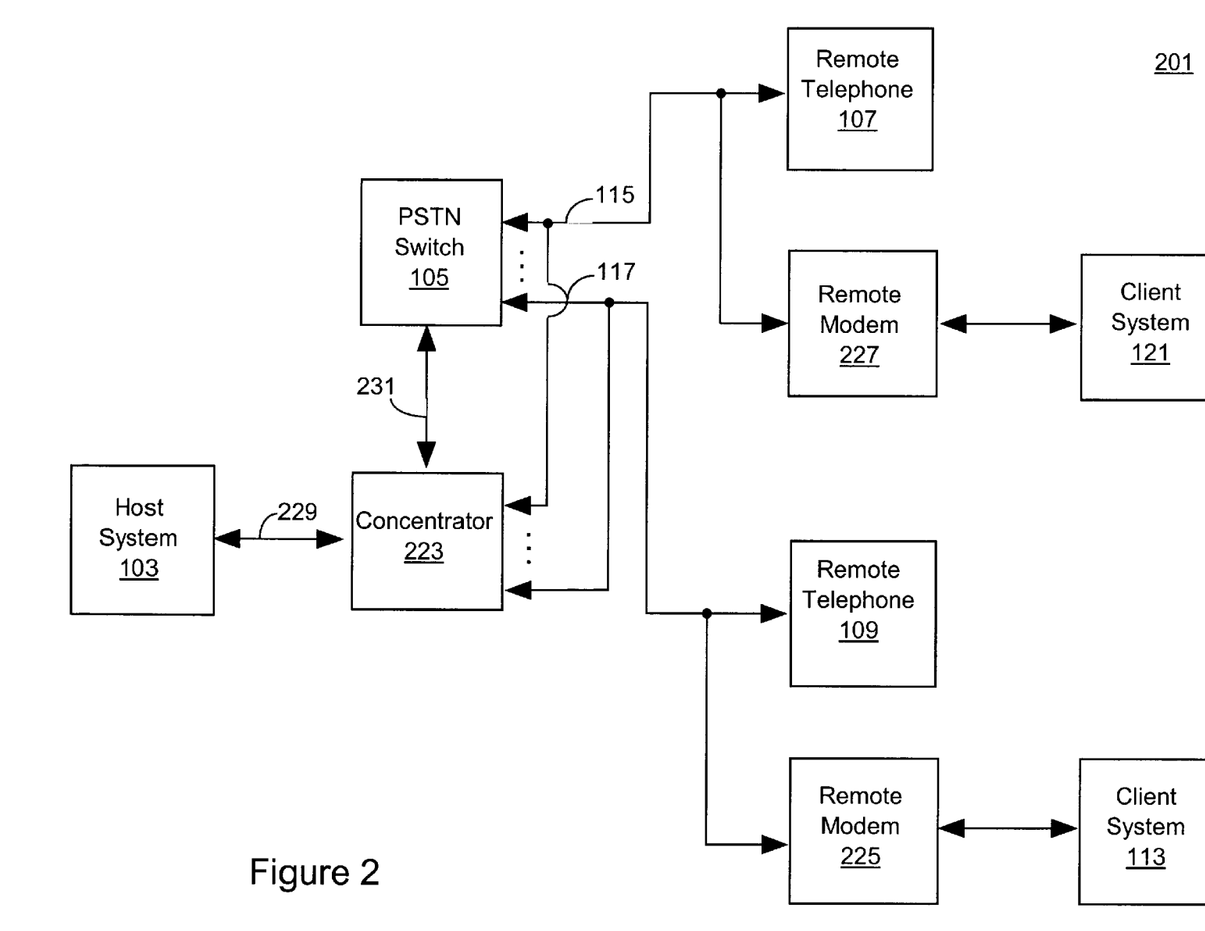
FIG. 2 is block diagram illustrating a telecommunications system providing data communications between a host system and a client system through a concentrator without burdening the PSTN switch with data communications traffic in accordance with the teachings of the present invention.

FIG. 2 is block diagram of a telecommunications system 201 in accordance with the teachings of the present invention. In one embodiment, a PSTN switch 105, located at a CO or a remote CO, is coupled to a plurality of remote telephones including remote telephone 107 and remote telephone 109, through a plurality of twisted pair wires 115 and 117, respectively. In one embodiment, twisted pair wires 115 and 117 are comprised of copper or another similar conductive material. In one embodiment, remote telephones 107 and 109 are located at a remote location relative to PSTN switch 105. In one embodiment, remote systems such as client system 121 and client system 113 are coupled to twisted pair wires 115 and 117 through remote modems 227 and 225, respectively. As shown in FIG. 2, remote modem 227 is coupled to twisted pair wire 115 at a point between PSTN switch 105 and remote telephone 107. Similarly, remote modem 225 is coupled to twisted pair wire 117 at a point between PSTN switch 105 and remote telephone 109. Remote telephone 109 and client system 113 share twisted pair wire 117 for voice and data communications, respectively. Similarly, remote telephone 107 and client system 121 share twisted pair wire 115 for voice and data communications, respectively. In one embodiment, client systems 121 and 113 may be personal computers, remote data terminals, Internet browsing devices or the like.

Telecommunications system 201 of FIG. 2 also includes a concentrator 223 coupled between twisted pair wires 115 and 117 and host system 103. As shown in FIG. 2, concentrator 223 is coupled to twisted pair wire 115 at a point between PSTN switch 105 and remote telephone 107. Similarly, concentrator 223 is coupled to twisted pair wire 117 at a point between PSTN switch 105 and remote telephone 109. Host system 103 is coupled to concentrator 223 through high speed data interface 229. In one embodiment, host system 103 may be an ISP, an on-line service, a server, a digital network or the like.

In one embodiment, high speed data communications are provided between host system 103 and client systems 121 and 113 over the existing twisted pair wires 115 and 117 of telecommunications system 201. The data communications are provided through concentrator 223 bypassing PSTN switch 105. As a result, the data communications traffic between host system 103 and client systems 121 and 113 does not travel through PSTN switch 105, thereby reducing the overall activity and data communications traffic flowing through PSTN switch 105. In one embodiment, well known data transmission techniques are utilized by the present invention which use sufficiently low energy levels such that PSTN switch 105 is unaware of any activity on twisted pair wires 115 and 117 during data communications.

In operation, there are two mutually exclusive modes for communications to take place over the twisted pair wires 115 and 117 of telecommunications network 201. The two modes are telephony mode and data mode. The transition between modes in accordance with the teachings of the present invention is illustrated in state diagram 301 of FIG. 3. While in telephony mode 303, normal telephony activity may take place in telecommunications system 201. For instance, a POTS telephone call carrying voice communications may take place over twisted pair wires 115 and 117 through PSTN switch 105 during telephony mode 303. While in data mode 305, data communications may take place over twisted pair wires 115 or 117 through concentrator 223.

Figure 3:
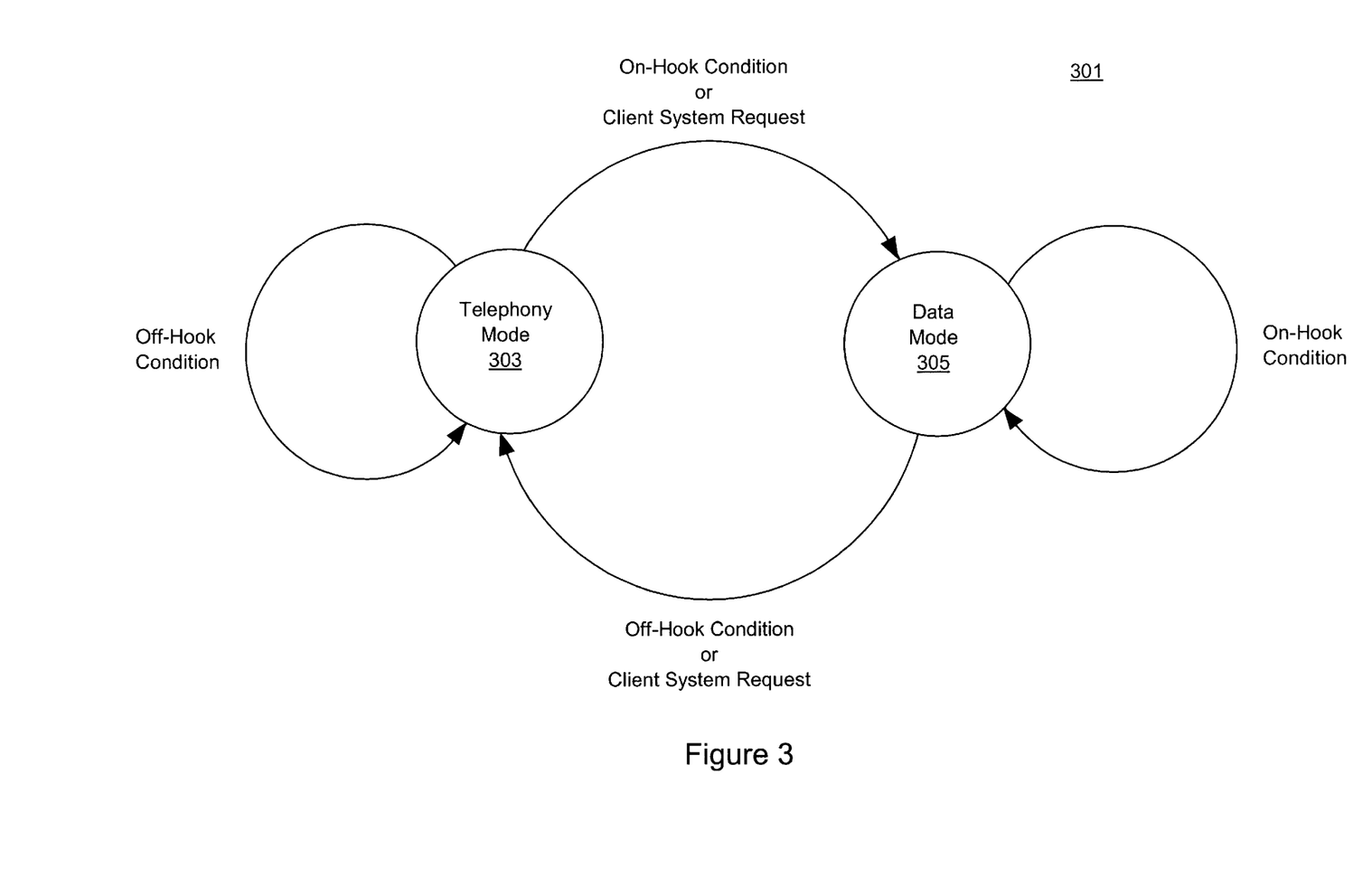
FIG. 3 is a state diagram illustrating the transitions between the telephony and data modes of a telecommunications system in accordance with the teachings of the present invention.

The logic for transferring between telephony mode and data mode in accordance with the teachings of the present invention is as follows. The PSTN term "off-hook" and "on-hook" describe the condition of electric current flowing through twisted pair wires 115 or 117. In particular, when no current is flowing through the twisted pair wire 115 or 117, there is an on-hook condition. The on-hook condition corresponds to when the remote telephone, such as for example remote telephone 107 or 109, is "hung up." It is noted that the predominant state of the PSTN system is on-hook. Whenever twisted pair wire 115 or 117 is in the off-hook condition, then telecommunications system 201 transfers into telephony mode 303. It is noted that while in data mode 305, an on-hook condition persists on the twisted pair wire 115 or 1 17. Similarly, while in telephony mode, an off-hook persists on the twisted pair wire 115 or 117.

To illustrate the transitions between telephony mode 303 and data mode 305, assume that there are data communications between host system 103 and client system 113 over twisted pair wire 117. In this example, twisted pair wire 117 is in data mode 305. If one desires to make a POTS telephone call with remote telephone 109, the transceiver on remote telephone 109 is enabled and an on hook to off-hook transition occurs on twisted pair wire 117. In this instance, the data communications between host system 103 and client system 113 are suspended and the telecommunications system 201 transitions from data mode 305 to telephony mode 303.

After the POTS telephone call of normal telephony mode 303 is complete, the line current on the twisted pair wire 117 drops to zero and an off-hook to on-hook transition occurs on twisted pair wire 117. In one embodiment, telecommunications system 201 automatically transfers back to data mode 305 in response to the off-hook to on-hook transition on twisted pair wire 117. In another embodiment, it is noted that the transition to data mode 305 from telephony mode 303 is not only governed by the twisted pair wire 117 being in the on-hook state, but also by the requirements of client system 113 or client system 121 as defined by a user at the remote location. This transition from telephony mode 303 to data mode 305 can be programmed to occur automatically or alternatively on an on-demand basis determined by the computer equipment of client system 113 or 121 at the remote location. In this instance, client system 113 or 121 would make an express request to remote modem 225 or 227 to transition from telephony mode 303 to data mode 305.

In one embodiment, telecommunications system 201 is assumed to initially be in telephony mode 303 such that there are no data communications between host system 103 and client system 113. In an embodiment in which remote modem 225 is programmed by the user to automatically initiate an attempt to transition to data mode 305 when there is an on-hook condition on twisted pair wire 117, remote modem 225 contacts concentrator 223 to establish data communications. In one embodiment, remote modem 225 contacts concentrator 223 by creating an off-hook condition on twisted pair wire 117 to alert PSTN switch 105 that remote modem 225 is ready to place a POTS initialization telephone call, via PSTN switch 105, to concentrator 223 through twisted pair wire 231. Once PSTN switch 105 recognizes the off-hook condition on twisted pair wire 117, PSTN switch 105 places a dial tone onto twisted pair wire 117. The remote modem 225 then proceeds to send dual telephone modulation frequency (DTMF) tones representing the PSTN number of the concentrator 223 connected to the same twisted pair wire 117. Concentrator 223 answers the POTS initialization telephone call. At this point, in one embodiment, remote modem 225 sends its identification number to the concentrator using DTMF. In other embodiments, remote modem 225 may send its identification number using frequency shift keying (FSK) or another well known signaling technique that is compatible with PSTN.

In another embodiment, concentrator 223 may identify remote modem 225 with Caller ID, thereby eliminating the necessity for remote modem 225 to send its identification number to concentrator 223 using DTMF tones.

In yet another embodiment, remote modem 225 signals concentrator 223 directly over twisted pair wire 117. In this embodiment, remote modem 225 sends out a request over twisted pair wire 117 during the on-hook condition. Concentrator 223 includes circuitry to recognize and identify the request over twisted pair wire 117 from remote modem 225.

Once identified, both remote modem 225 and concentrator 223 exchange connection information about how the twisted pair line 117 shared between them will be utilized during the data mode. Assuming a POTS initialization telephone call has been utilized, remote modem 225 releases twisted pair line 117 completing the POTS initialization telephone after the connection information has been exchanged. Remote modem 225 then immediately begins an attempt to establish a direct connection with concentrator 223 bypassing PSTN switch 105. Concentrator 223 also attempts to establish the link and uses the connection information obtained from the previous exchange to properly connect twisted pair line 117 to host system 103 through the internal circuitry of concentrator 223, which will be discussed in greater detail below.

In one embodiment, the data communications link is established after host system 103 and client system 113 complete a pre-defined series of instructions geared towards creating a link with high reliability. In one embodiment, well known communications protocols are utilized to establish a high speed data communications link. For instance, in one embodiment, a high bit rate digital subscriber line (HDSL) data transmission protocol is utilized. In other embodiments, other digital subscriber line (DSL) data transmissions, such as for example but not limited to an asynchronous digital subscriber line (ADSL) data transmission, may be utilized in accordance with the teachings of the present invention to establish high speed data communications between host system 103 and client system 113. It is appreciated that other high speed data communications techniques may be utilized in accordance with the teachings of the present invention.

In an embodiment in which HDSL data transmissions are utilized, one end of the data communications link is defined as a master and the other end is defined as a slave. When no data communications link exists, the slave looks for a signal from the master. If the slave finds a signal from the master, the slave will send its own signal back to the master indicating it has received the master signal. From this point on, both the master and slave take turns adjusting their transmitters and receivers for optimal quality. In one embodiment, this adjustment process may take upwards of 30 seconds to complete. In another embodiment, the adjustment process may take less time with more efficient algorithms. Once the master and slave are finished, telecommunications system 201 enters data mode 305. In one embodiment, the data communications link of data mode is a high speed full duplex communications link.

It is noted that even while telecommunications system 201 is in data mode 305, neither PSTN switch 105 or the telephony equipment, such as for example remote telephone 107 or 109 located at the remote locations, are barred from acting as normal PSTN devices. Normal ring signals can be transmitted down twisted pair wires 115 and 117 from the PSTN switch 105 and not cause the telecommunications system 201 to change from data mode back to telephony mode.

It is noted that in one embodiment, a ring signal may temporarily increase error rates, but will not interrupt data communications transmissions. In order to avoid interruptions, a POTS call may be placed from modem 225 to concentrator 223 through PSTN switch 105 and twisted pair wires 117 and 231. This call is then held open during the entire time of the data communications link, thus preventing any incoming calls from PSTN switch 105 via twisted pair wire 117. It is noted that this scenario results in PSTN switch 105 being occupied with traffic or activity during the data communications link. One solution to this problem is to install a "make busy" or "busy out" signaling protocol in PSTN switch 105 using well known techniques similar to those presently used as a means to enable or disable call-waiting.

In another embodiment, there are several events that may occur to transition telecommunications 201 from data mode 305 back to telephony mode 303. For instance, remote modem 225 may transition telecommunications system 201 from data mode 305 to telephony mode 5303 at any time via pre-programming or an express request from client system 113. As illustrated in FIG. 3, any off-hook condition will cause the telecommunications system to transition from data mode 305 to telephony mode 303. This transition may occur after a telephony device senses a ring voltage from PSTN switch 105 and wishes to "answer" the ring. In another embodiment, a human may simply pick-up a receiver on remote telephone 109 to answer the call thereby causing the on-hook to off-hook transition on the twisted pair line 117.

In one embodiment, as soon as twisted pair line 117 transitions from the on-hook to off-hook state, remote modem 225 immediately ceases data communications. Thus, twisted pair wire 117 is available for PSTN switch 105. Remote modem 225 also captures information relating to the state of the data communications for use when it reestablishes the data communications link at a later time. Concentrator 223 detects the loss of the data signal from remote modem 225 correspondingly disengages data communications. Similar to remote modem 225, internal circuitry of concentrator 223 saves information regarding the data communications transmission for use when the data communications link is later re-established.

As discussed, one embodiment of telecommunications system 201 automatically reestablishes data communications as soon as twisted pair wire 115 transitions back to the on-hook condition from the off-hook condition. In effect, in this embodiment, the remote modems 225 and 227 are always transmitting whenever the twisted pair wires 115 and 117 are not in telephony mode. This permanent connection is interrupted whenever the twisted pair wires are used for telephony functions but resumes data mode as soon as the twisted pair wires return to the on-hook condition. It is noted that a permanent connection in accordance with the teachings of the present invention does not necessarily imply that data must always be transmitted. In some instances, the remote modems may remain idly connected in data mode to concentrator 223.

Figure 4:
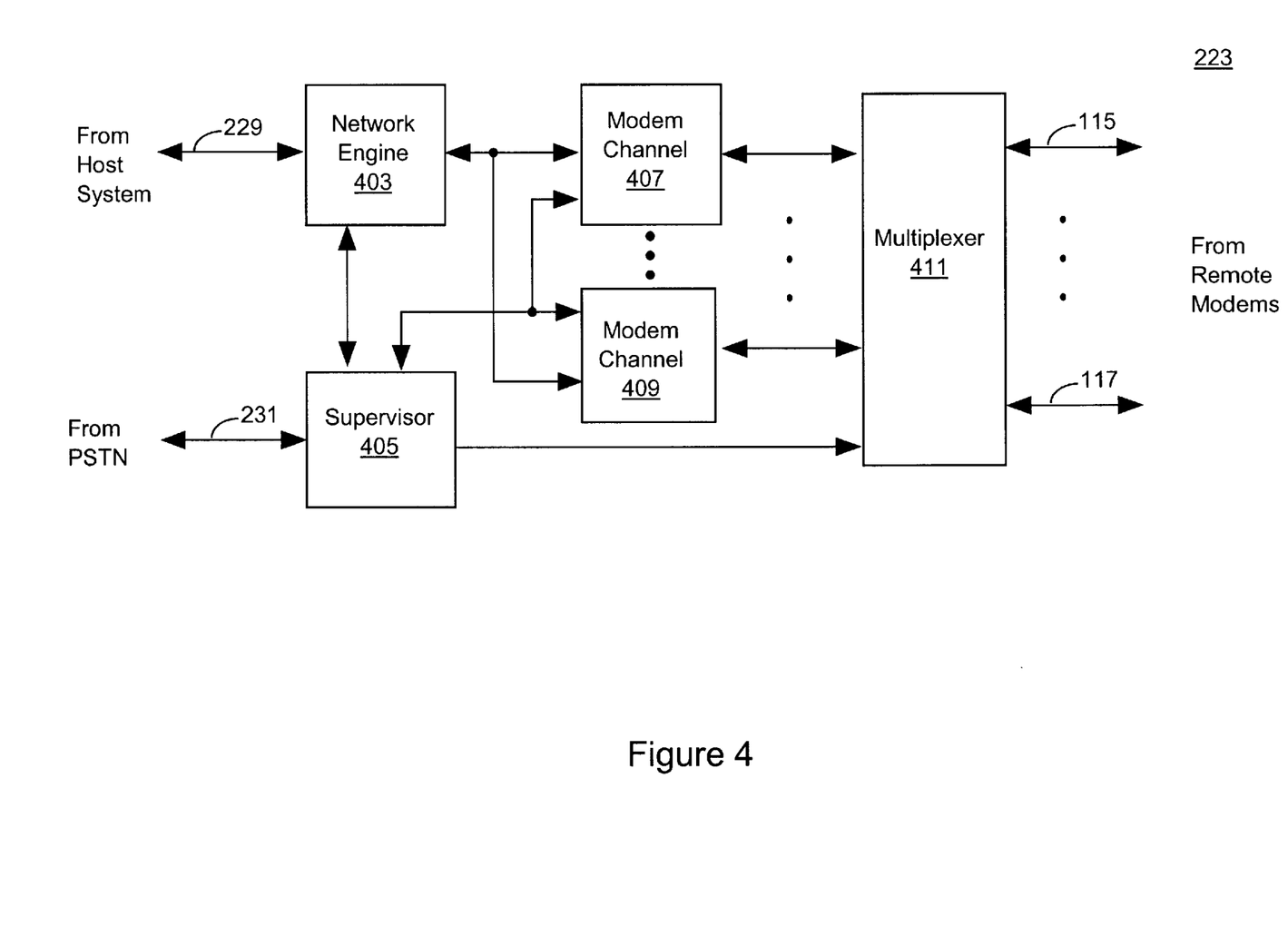
FIG. 4 is a block diagram illustrating the elements of a concentrator in accordance with the teachings of the present invention.

FIG. 4 is a detailed block diagram of one embodiment of concentrator 223 in accordance with the teachings of the present invention. Concentrator 223 includes multiplexer 411, network engine 403 and supervisor 405. Multiplexer 411 is coupled to a plurality of twisted pair wires including twisted pair wire 117 and twisted pair wire 115. A plurality of modem channels including modem channel 407 and modem channel 409 are coupled to multiplexer 411 as shown in FIG. 4. Network engine 403 is coupled between modem channels 407 and 409 and host system 103 through high speed data interface 229. Supervisor 405 is coupled to network engine 403, the plurality of modem channels including modem channel 407 and modem channel 409, and multiplexer 411. Supervisor 405 is also coupled to PSTN switch 105 through twisted pair wire 231.

Supervisor 405 uses the connection information obtained during the earlier exchange between remote modem 225 and concentrator 223 to set multiplexer 411 to connect twisted pair wire 117 to the proper modem channel 409 or 407 in addition to instructing network engine 403 to activate a corresponding modem channel 409 or 407. Data enters multiplexer 411 from twisted pair wire 115 and 117.

In one embodiment, multiplexer 411 is configured to connect any one of the plurality of twisted pair wires, including twisted pair wire 117 and twisted pair wire 115, to one of the plurality of modem channels, including modem channel 407 and modem channel 409. The multiplexer 411 contains line protection circuitry to protect both human and electrical equipment from the dangers of electrical over-voltage conditions on twisted pair wires 117 and 115. In one embodiment, multiplexer 411 may be 1:1 between input and output ports or be greater than 1:N for an ability to service many different pairs of twisted pair wires with fewer modem channels. In one embodiment, multiplexer 411 is capable of handling full duplex data transmission.

Data is sent from modem channel 407 or 409 to network engine 403 where it is prepared to be sent to host system 103 through high speed data interface 229. In another embodiment, the data may be sent back through another modem channel 407 or 409 through multiplexer 411 to another remote modem, such as for example remote modem 227, through twisted pair wire 117. In one embodiment, network engine 403 provides logic and computational power to convert data received from modem channels 407 and 409 to wide area network (WAN) protocols. At the same time, one embodiment of network engine 403 is responsible for governing the band width allocated to each modem channel 407 and 409 from the host system 103.

Data coming from the host system 103 through high speed data interface 229 destined for one of the remote modems 225 or 227 enters network engine 403. Network engine 403 has the task of determining which one of the remote modems 225 or 227 for which the data is intended. Once determined, the data is forwarded to the appropriate modem channel 407 or 409 where it is then forwarded through multiplexer 411 and over the appropriate twisted pair wire 115 or 117 to the target remote modem 225 or 227.

In one embodiment, supervisor 405 contains a central processing unit (CPU) which interfaces to PSTN switch 105 through twisted pair wire 231. In one embodiment, the primary functions of supervisor include receiving POTS telephone calls from remote modems, setting up the multiplexer and modem channel connections between multiplexer 411 and modem channels 407 and 409, maintaining user information, such as for example but not limited to customary information about rates and services, and handling error conditions occurring in concentrator 223.

Figure 5:
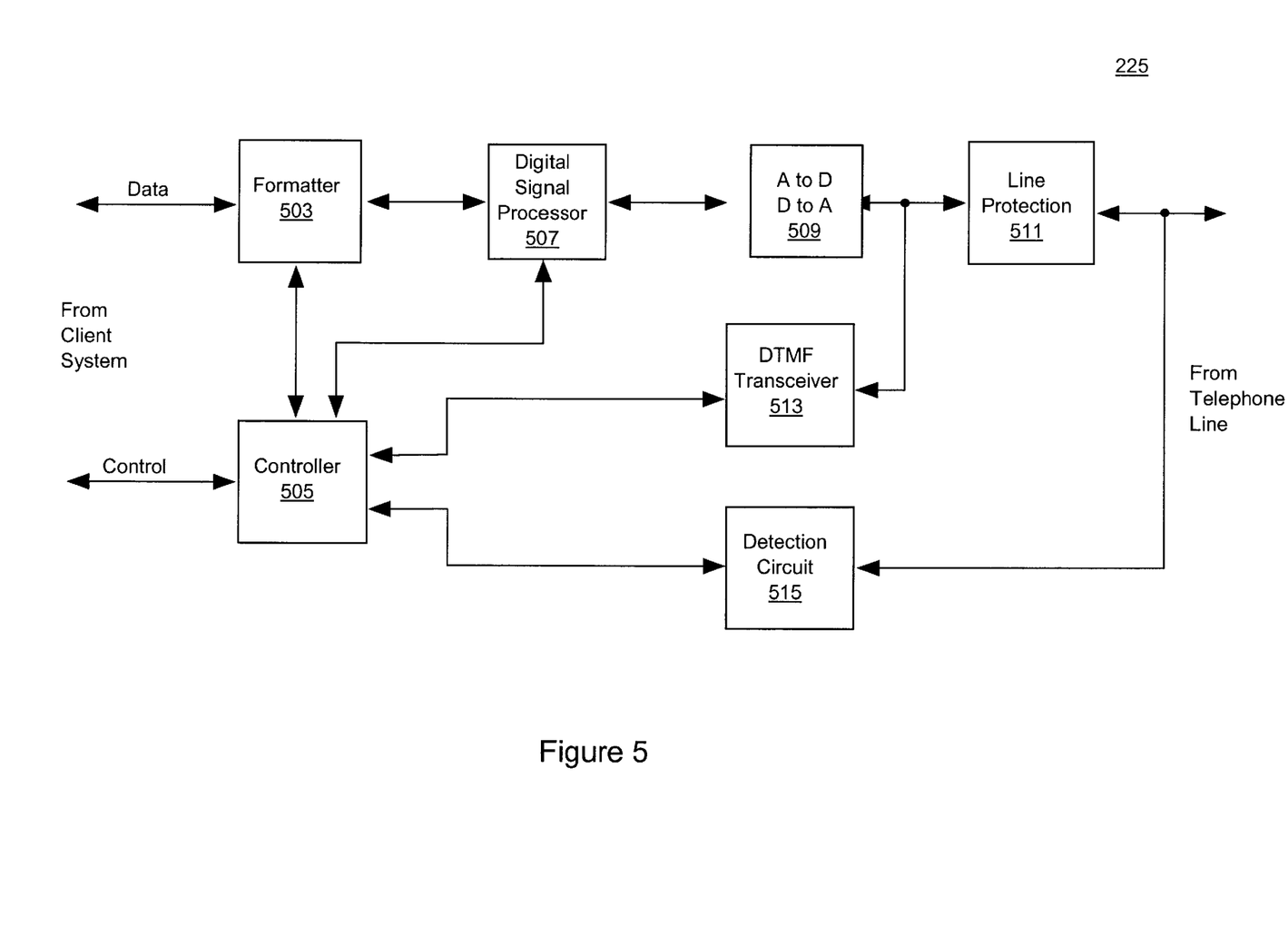
FIG. 5 is a block diagram illustrating the elements of a remote modem in accordance with the teachings of the present invention.

FIG. 5 is a block diagram illustrating the elements of remote modem 225 in accordance with the teachings of the present invention. Remote modem 225 includes a line protection circuit coupled to twisted pair wire 117. An analog-to-digital and digital-to-analog (A-to-D and D-to-A) processor 509 and DTMF transceiver 513 are coupled to line protection circuit 511. A digital signal processor (DSP) 507 is coupled to A-to-D and D-to-A processor 509 and a formatter 503 is coupled to DSP 507. A detection circuit 515 is also coupled the twisted pair line 417. Controller 505 is coupled to formatter 503, DSP 507, DTMF transceiver 513 and detection circuit 515. Data is transferred between client system 113 and formatter 503 and control information is transferred between client system 113 and controller 505.

In one embodiment, line protection circuit 511 includes passive electrical components designed to protect both human and electrical equipment from the dangers of electrical over-voltage conditions on twisted pair wire 117. In one embodiment, line protection circuit 511 includes resettable fuses, high speed voltage shunting devices and radio frequency emission suppressors.

In one embodiment, detection circuit 515 includes its own built in line protection and provides a way for remote modem 225 to determine if twisted pair line 117 is either in the on-hook condition or the off-hook condition. This information is transferred to and used by controller 505.

In one embodiment, DTMF transceiver 513 includes active electrical components necessary to send and receive PSTN DTMF signals. In an alternate embodiment, the DTMF transceiver function may also be implemented in DSP 507.

In one embodiment, formatter 503 provides active logic to take incoming data to and from client system 113, format the data and send it along to DSP 507 for transmission over twisted pair wire 117. Conversely, formatter 503 receives data from DSP 507, and presents the data in the correct format for use by client system 113 coupled to remote modem 225. Examples of formats used by formatter 503 include, but are not limited to, Ethernet, PCI local bus, parallel port, Firewire, Universal Serial Bus (USB), or the like.

In one embodiment, DSP 507 is an active module that utilizes advanced vector math to format the data so that the data can be reliably transmitted over a twisted pair wire 117. In one embodiment, DSP 507 includes noise cancellation, full duplex operation, line matching, adaptive filtering, adaptive equalization, echo cancellation and line encoding.

In one embodiment, the to A-to-D and D-to-A processor 509 is an active module that converts DSP 507 digital signals into analog signals for twisted pair wire 117. Conversely, A-to-D and D-to-A processor 509 also converts analog signals received from twisted pair line 117 into digital signals for use by DSP 507.

In one embodiment, controller 505 includes a microprocessor that controls the activities of remote modem 225. Among the tasks performed by the microprocessor of controller 505 include management of the transmissions between data mode and telephony mode, error reporting and recovery, configuration, line maintenance and formatter function. Similar to formatter 503, the interface to controller 505 from client system 113 may be based on a variety of well known options such as for example but not limited to Ethernet, PCI local bus, parallel port, Firewire, USB, or the like. In another embodiment, data and control may be achieved over a single interface to client system 113.

Referring briefly back to FIG. 4, it is noted that concentrator 223 may be considered as a super-set of remote modem 225 since modem channels 407 and 409 encompass much of the functionality of remote modem 225. In one embodiment, modem channels 407 and 409 are similar to remote modem 225, but do not include detection circuit 515, DTMF transceiver 513 and line protection circuit 511. However, the remaining functions of remote modem 225 are similar for modem channels 407 and 409.

Figure 6:
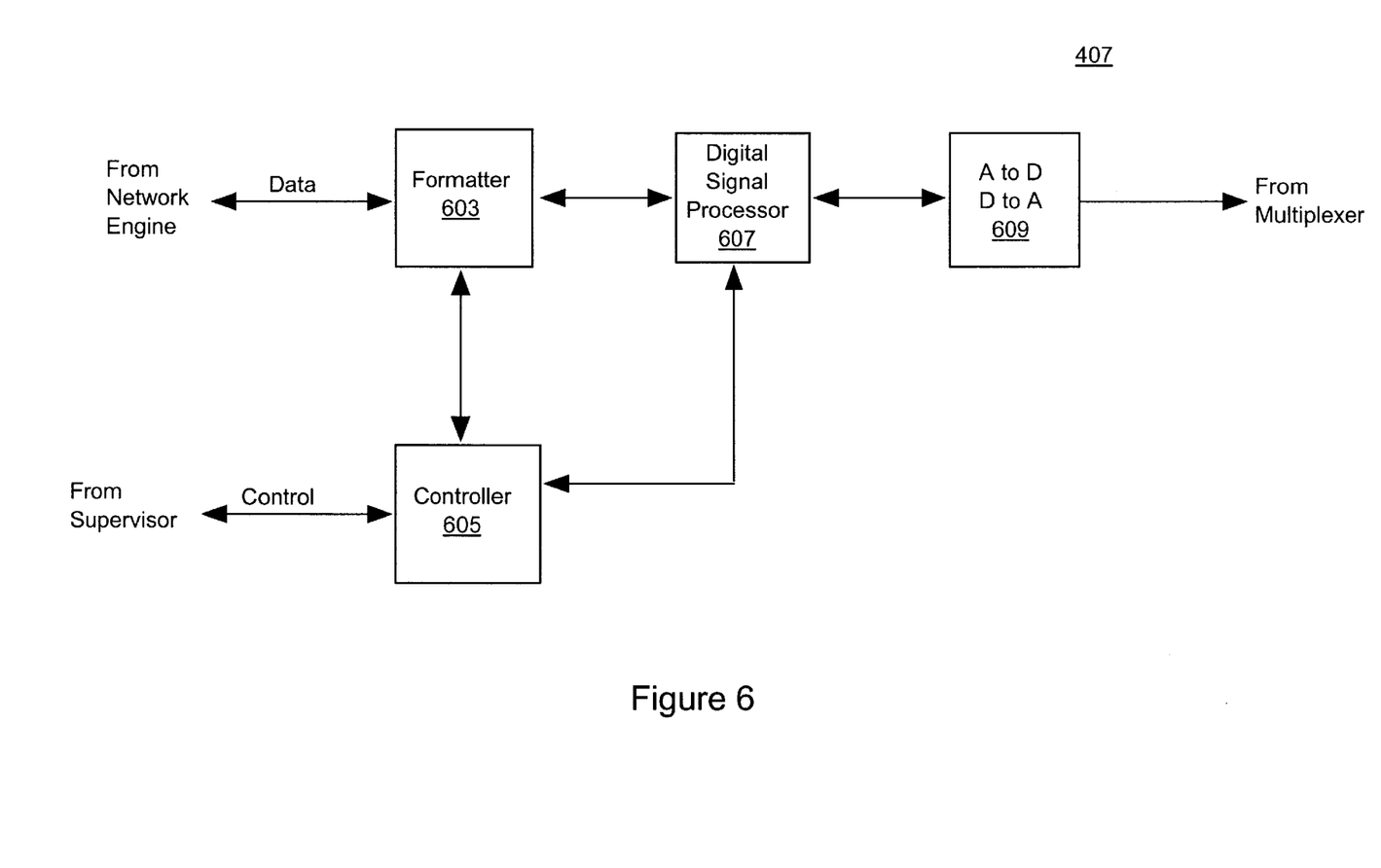
FIG. 6 is an illustration illustrating the elements of a modem channel of a concentrator in accordance with the teachings of the present invention.

To illustrate, FIG. 6 is a detailed block diagram showing the elements included in modem channel 407. It is appreciated that each one of the plurality of modem channels of concentrator 223 is substantially similar to modem channel 407, as illustrated in FIG. 6. As shown, modem channel 407 includes an A-to-D and D-to-A processor 609 coupled to multiplexer 411. DSP 607 is coupled to A-to-D and D-to-A processor 609 and formatter 603 is coupled to DSP 607. Controller 605 is coupled to formatter 603 and 607. Data is transmitted between network engine 403 and formatter 603 and control information is transmitted between supervisor 405 and controller 605.

It is appreciated that in one embodiment, the functions of controller 605 correspond to the functions of controller 505, the functions of formatter 603 correspond to the functions of formatter 503, the functions of DSP 607 correspond to the functions of DSP 507, and the functions of A-to-D and D-to-A processor 609 correspond to the functions of A-to-D and D-to-A processor 509.

Figure 7:
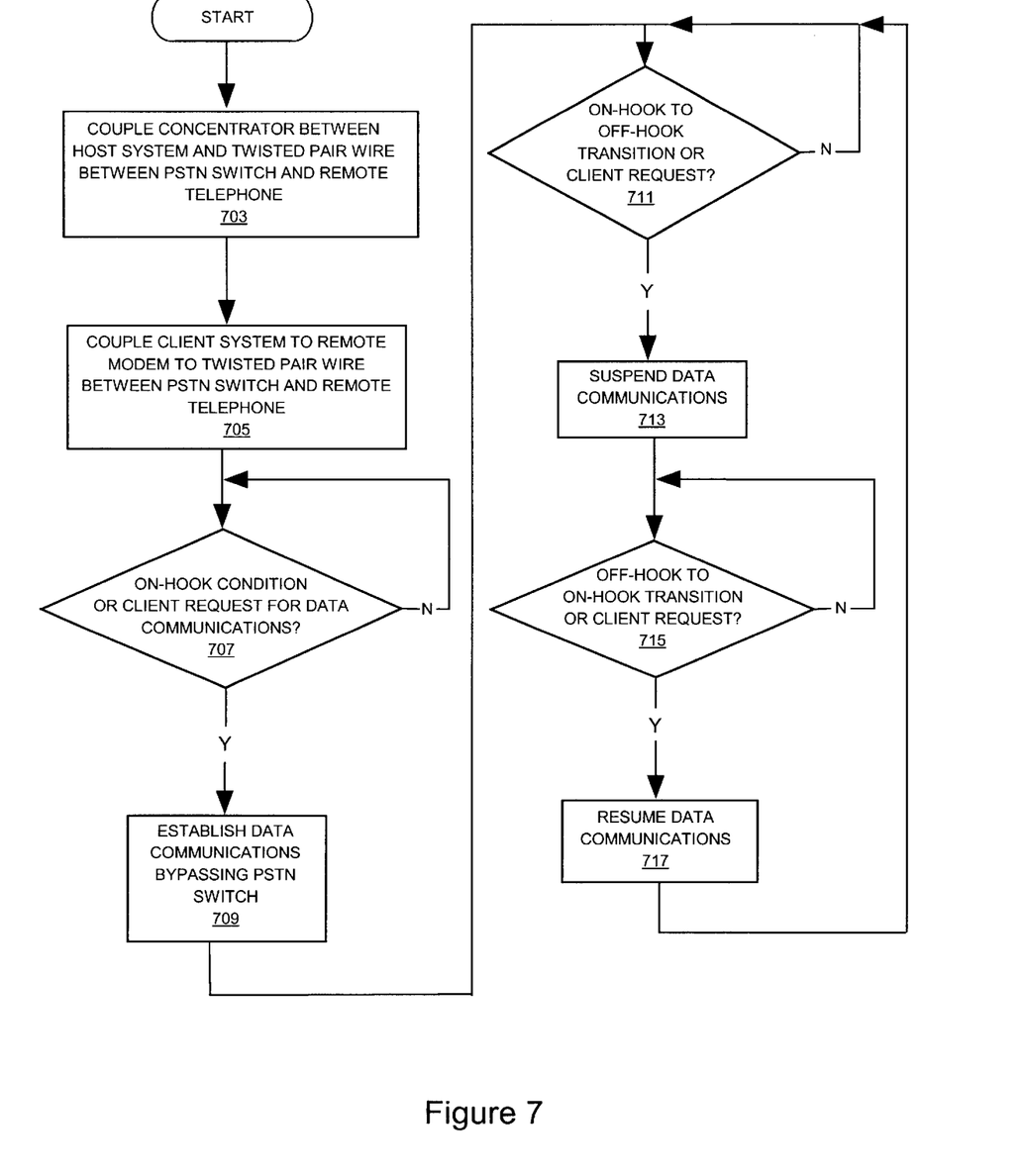
FIG. 7 is a flow chart diagram illustrating the steps performed to provide data communications between the host and client systems in accordance with the teachings of the present invention.

FIG. 7 is a flow diagram 701 illustrating the steps performed in accordance with the teachings of one embodiment of the present invention. As shown in processing step 703, a concentrator is coupled between the host system and a twisted pair telephone wire between the PSTN switch and the remote telephone. Processing step 705 shows that a client system is coupled to a remote modem coupled to the twisted pair telephone wire, which is coupled between the PSTN switch and the remote telephone. Next, decision step 707 illustrates that it is determined whether an on-hook condition is detected or if there is a client system request to establish data communications. If there is a client system request or, in the alternative, if the telecommunications system is configured to automatically switch to data mode when there is an on-hook condition, processing step 709 illustrates that data communications are then established between the host system and client systems bypassing the PSTN switch.

Next it is determined when the telecommunications system of the present invention transfers from data mode back to telephony mode. In one embodiment, an on-hook to off-hook transition is detected to determine when to switch from data mode to telephony mode. In another embodiment, the telecommunications system according to the present invention switches from data mode to telephony mode in response to a request from the client system. This aspect of the present invention is illustrated in decision step 711. Once the on-hook to off-hook transition or the client request is detected, data communications between the client system and the host system are suspended, as indicated in processing step 713. At this time the telecommunications is back in telephony mode. At this time, normal telephony functions may therefore take place over the twisted pair line, including voice communications.

In one embodiment, the telecommunications system of the present invention automatically attempts to reestablish data mode by detecting an off-hook to on-hook transition. In another embodiment, data mode is not reestablished until there is a request from the client to reestablish data communications. This aspect of the present invention is illustrated in decision step 715. Once it is determined that data mode is to be reestablished, data communications are resumed, as illustrated in processing step 717. In one embodiment, the method in accordance with the teachings of the present invention loops back to decision step 711 such that the telecommunications system switches back and forth from telephony mode to data mode as discussed above.

Figure 8:
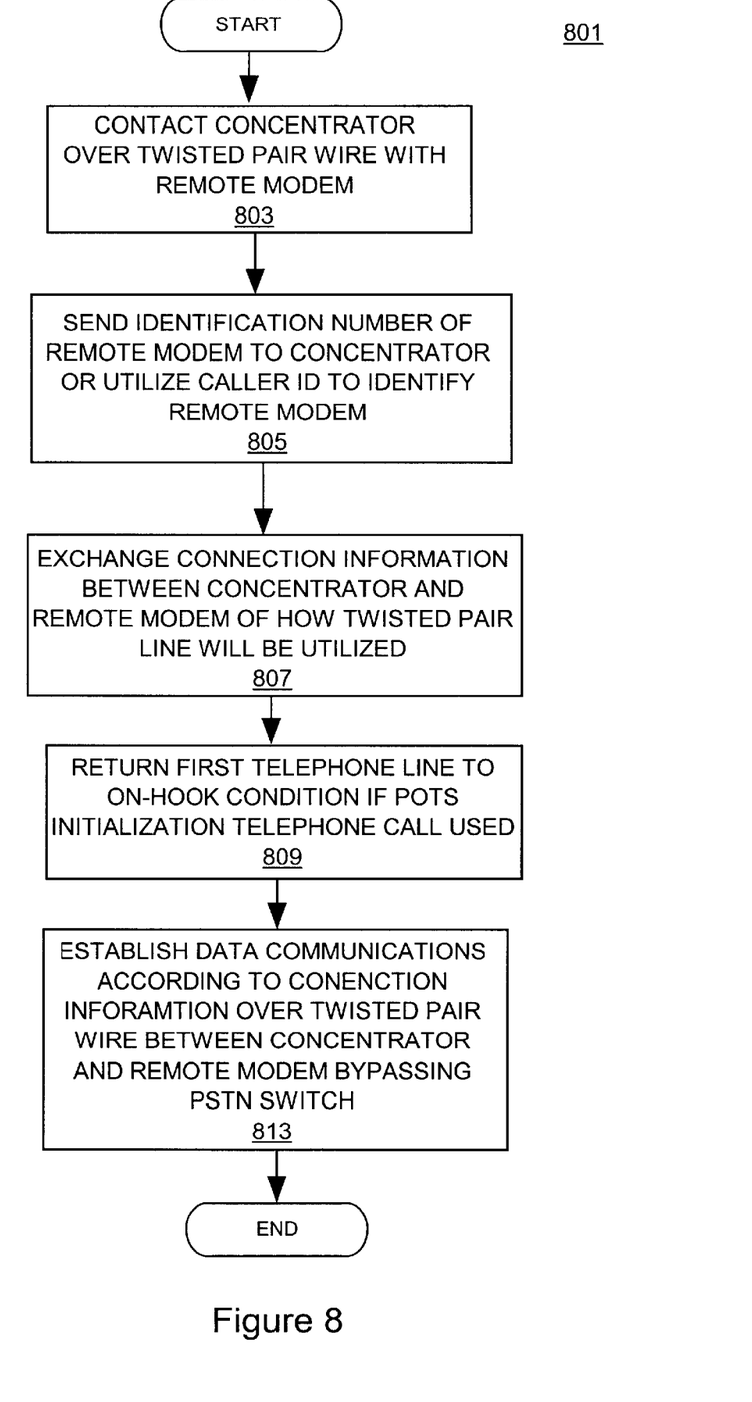
FIG. 8 is a flow chart diagram illustrating the steps performed when establishing data communications bypassing the PSTN switch through the concentrator in accordance with the teachings of the present invention.

FIG. 8 is a flow diagram 801 illustrating processing steps performed in accordance with the teachings of the present invention when establishing data communications between the host and client systems. In one embodiment, the remote modem first contacts the concentrator, illustrated as processing step 803 in FIG. 8. In one embodiment, remote modem contacts concentrator by placing a POTS initialization telephone call over the twisted pair telephone wire using PSTN switch 105. In another embodiment, the remote modem contacts the concentrator directly through the twisted pair telephone wire. As discussed earlier, a concentrator in this embodiment of the present invention includes circuitry to sense signals from the remote modem when the remote modem attempts to contact the concentrator.

Once the concentrator has been contacted by the remote modem, an identification number is sent from the remote modem to the concentrator, as illustrated in processing step 805. In one embodiment, the identification number is sent via DTMF tones over the twisted pair telephone wire. In another embodiment in which the remote modem contacted concentrator through a POTS initialization telephone call, the concentrator is able to identify remote modem using Caller ID.

Next, connection information is exchanged between the concentrator and the remote modem of how the twisted pair telephone wire will be utilized. This aspect of the present invention is illustrated in processing step 807. After the connection information has been exchanged, the twisted pair telephone wire is returned to an on-hook condition, if it is not already in an on-hook condition. This aspect of the present invention is illustrated in processing step 809. Finally, data communications are established over the twisted pair telephone wire between the concentrator and the remote modem by passing the PSTN switch according to the connection information exchanged in processing step 807. This aspect of the present invention is illustrated in processing step 813.

In an alternate embodiment, it is noted that a telecommunications system in accordance with the teachings of the present invention may realize an uninterrupted data communications link by tying up, or busying out, the corresponding twisted pair lines such that the PSTN switch is unable to utilize the twisted pair line for normal telephony functions. Referring back to FIG. 2, remote modem 225 in this embodiment first creates an off-hook condition on twisted pair line 117. The PSTN switch 105 senses the off-hook condition and begins supplying a dial tone over twisted pair wire 117. In one embodiment, after approximately thirty seconds, PSTN switch 105 a voice recording stating "if you would like to make a call . . . "followed by approximately another approximately minute and a half of loud modulated tones. In one embodiment, PSTN switch 105 ceases its modulation of twisted pair wire 117 after approximately two and a half minutes. In this state, PSTN switch 105 is guaranteed not to modulate ring voltage onto twisted pair wire 117. Within a fixed period of time after PSTN switch 105 ceases to modulate twisted pair wire 117, remote modem 225 and concentrator 223 initiate a brief link establishment protocol similar to that described above. The data communications link is then established between host system 103 and client system 113. It is appreciated that while the data communications link is established, neither the remote telephone 109 or PSTN switch 105 are allowed to modulate twisted pair wire 117. To terminate this session, remote modem 225 releases twisted pair line 117 to the on-hook condition.

Thus, what has been described is a method and an apparatus providing data communications between a host system and a client system over existing telephone networks that does not interfere with the operation of telecommunications apparatus connected to the telephone network. In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A telecommunications system, comprising:
    a concentrator coupled between a host system and a first telephone line of a public switched telephone network (PSTN), the first telephone line coupling together the PSTN switch and a remote telephone, the concentrator coupled to the first telephone line between the PSTN switch and the remote telephone, said concentrator comprising:
        a multiplexer coupled to a plurality of telephone lines including the first telephone line;
        a plurality of modem channels coupled to the multiplexer;
        a network engine coupled to the plurality of modem channels and to the host system, the network engine converting data transferred between the modem channels and the host system; and
        a supervisor coupled to the PSTN switch through a second telephone line, to the network engine, to the plurality of modem channels and to the multiplexer, the supervisor controlling the multiplexer to couple the first telephone line to one of the plurality of modem channels in response to the PSTN switch;
    a remote modem coupled between a client system and the first telephone line such that data communications are established between the host system and the client system over at least a portion of the first telephone line through the concentrator and the remote modem, the data communications bypassing the PSTN switch; and
    a detection circuit coupled to the first telephone line, the data communications occurring between the host and client systems during an on-hook condition on the first telephone line detected by the detection circuit, the telecommunications system suspending the data communications between the host and client systems in response to an on-hook to off-hook transition on the first telephone line detected by the detection circuit.

2. The telecommunications system of claim 1 wherein the data communications are re-established between the host and client systems in response to an off-hook to on-hook condition transition on the first telephone line detected by the detection circuit.

3. The telecommunications system of claim 1 wherein the data communications are initially established between the host and client systems over the first telephone line through the concentrator and the remote modem during an on-hook condition detected by the detection circuit.

4. The telecommunications system of claim 1 wherein a plain old telephone service (POTS) telephone call is enabled over the first telephone line between the PSTN switch and the remote telephone after the on-hook to off-hook transition is detected by the detection circuit on the first telephone line.

5. The telecommunications system of claim 1 wherein each one of the plurality of modem channels comprise:
    an analog-to-digital and digital-to-analog (A-to-D and D-to-A) processor coupled to the multiplexer;
    a digital signal processor (DSP) coupled to the A-to-D and D-to-A processor;
    a formatter coupled between the network engine and the DSP; and
    a controller coupled to the supervisor, to the formatter and to the DSP, the controller controlling the formatter and the DSP in response to the supervisor.

6. The telecommunications system of claim 1 wherein the first telephone line comprises a twisted pair line.

7. The telecommunications system of claim 1 wherein the host system comprises an Internet service provider (ISP) and the client system comprises a remote computer interacting with the ISP.

8. The telecommunications system of claim 1 wherein the data communications utilize high bit rate digital subscriber line (HDSL) data transmissions.

9. The telecommunications system of claim 1 wherein the data communications utilize asymmetrical digital subscriber line (ADSL) data transmissions.

10. In a telecommunications system, a method of coupling a host system to a client system, comprising:
    coupling a concentrator between the host system and a first telephone line of a public switched telephone network (PSTN), the first telephone line coupling together a PSTN switch and a remote telephone, the concentrator coupled to the first telephone line between the PSTN switch and the remote telephone;
    coupling the client system to the first telephone line through a remote modem, the remote modem coupled to the first telephone line between the PSTN switch and the remote telephone;
    establishing data communications over at least a portion of the first telephone line of the PSTN between the host system and the client system during a data mode, the data mode occurring during an on-hook condition on the first telephone line, the data communications over the first telephone line of the PSTN between the host system and the client system bypassing the PSTN switch, said establishing step further comprising:
        placing a plain old telephone service (POTS) initialization telephone call to the concentrator from the remote modem through the first telephone line during an off-hook condition, the PSTN switch and a second telephone line coupling the remote modem to the concentrator;
        identifying the remote modem with the concentrator;
        exchanging during the POTS initialization telephone call between the concentrator and the remote modem connection information regarding how the first telephone line will be utilized during the data communications;

returning the first telephone line to the on-hook condition with the remote modem after the POTS initialization telephone call; and establishing the data communications over at least a portion of the first telephone line of the PSTN between the host system and the client system according to the connection information;

suspending the data communications over the first telephone line of the PSTN between the host system and the client system in response to an on-hook to off-hook transition on the first telephone line, a telephony mode occurring during an off-hook condition.

11. The method described in claim 10 wherein a plain old telephone service (POTS) telephone call may be made during the off-hook condition between the remote telephone and the PSTN switch over the first telephone line.

12. The method described in claim 10 further comprising resuming the suspended data communications over at least a portion of the first telephone line of the PSTN between the host system and the client system in response to an off-hook to on-hook transition on the first telephone line.

13. The method described in claim 10 wherein identifying the remote modem comprises sending an identification number of the remote modem from the remote modem to the concentrator during the POTS initialization telephone call.

14. The method described in claim 10 wherein identifying the remote modem comprises utilizing Caller ID to identify the remote modem.

15. The method described in claim 10 wherein the data communications utilize high bit rate digital subscriber line (HDSL) data transmissions.

16. The method described in claim 10 wherein the data communications utilize asymmetrical digital subscriber line (ADSL) data transmissions.

17. The method described in claim 10 wherein the data communications are maintained when a ring signal is received by the remote modem from the PSTN switch over the first telephone line.

18. The method described in claim 10 further comprising suspending the data communications over the first telephone line of the PSTN between the host system and the client system in response to the client system.

19. The method described in claim 10 further comprising suspending the data communications over the first telephone line of the PSTN between the host system and the client system in response to client system request, the telephony mode occurring after the data communications are suspended.

20. A telecommunications system, comprising:

a concentrator coupled between a host system and a first telephone line of a public switched telephone network (PSTN), the first telephone line coupling together the PSTN switch and a remote telephone, the concentrator coupled to the first telephone line between the PSTN switch and the remote telephone;

a remote modem coupled between a client system and the first telephone line such that data communications are established between the host system and the client system over at least a portion of the first telephone line through the concentrator and the remote modem, the data communications bypassing the PSTN switch, said remote modem comprising:

a line protection circuit coupled to the first telephone line;

an analog-to-digital and digital-to-analog (A-to-D and D-to-A) processor coupled to the line protection circuit;

a digital signal processor (DSP) coupled to the A-to-D and D-to-A processor;

a formatter coupled between the client system and the DSP;

a dual telephone modulation frequency (DTMF) transceiver coupled to the line protection circuit;

the detection circuit coupled to the first telephone line; and a controller coupled to the client system, to the formatter, to the DSP, to the DTMF transceiver, and to the detection circuit, the controller controlling the formatter, the DSP, and the DTMF transceiver in response to the client system and the detection circuit; and a detection circuit coupled to the first telephone line, the data communications occurring between the host and client systems during an on-hook condition on the first telephone line detected by the detection circuit, the telecommunications system suspending the data communications between the host and client systems in response to an on-hook to off-hook transition on the first telephone line detected by the detection circuit.

21. In a telecommunications system, a method of coupling a host system to a client system, comprising:

coupling a concentrator between the host system and a first telephone line of a public switched telephone network (PSTN), the first telephone line coupling together a PSTN switch and a remote telephone, the concentrator coupled to the first telephone line between the PSTN switch and the remote telephone;

coupling the client system to the first telephone line through a remote modem, the remote modem coupled to the first telephone line between the PSTN switch and the remote telephone;

establishing data communications over at least a portion of the first telephone line of the PSTN between the host system and the client system during a data mode, the data mode occurring during an on-hook condition on the first telephone line, the data communications over the first telephone line of the PSTN between the host system and the client system bypassing the PSTN switch, said establishing step further comprising:

sending during the on-hook condition a dual telephone modulation frequency (DTMF) request message from the remote modem to the concentrator over the first telephone line;

exchanging between the concentrator and the remote modem using DTMF tones connection information regarding how the first telephone line will be utilized during the data communications;

establishing the data communications over at least a portion of the first telephone line of the PSTN between the host system and the client system according to the connection information;

suspending the data communications over the first telephone line of the PSTN between the host system and the client system in response to an on-hook to off-hook transition on the first telephone line, a telephony mode occurring during an off-hook condition.

22. In a telecommunications system, a method of coupling a host system to a client system, comprising:

coupling a concentrator between the host system and a first telephone line of a public switched telephone network (PSTN), the first telephone line coupling together a PSTN switch and a remote telephone, the concentrator coupled to the first telephone line between the PSTN switch and the remote telephone;

coupling the client system to the first telephone line through a remote modem, the remote modem coupled to the first telephone line between the PSTN switch and the remote telephone;

establishing data communications over at least a portion of the first telephone line of the PSTN between the host system and the client system during a data mode, the data mode occurring during an on-hook condition on the first telephone line, the data communications over the first telephone line of the PSTN between the host system and the client system bypassing the PSTN switch, said establishing step further comprising:

sending during the on-hook condition a frequency shift keying (FSK) request message from the remote modem to the concentrator over the first telephone line;

exchanging between the concentrator and the remote modem using FSK connection information regarding how the first telephone line will be utilized during the data communications;

establishing the data communications over at least a portion of the first telephone line of the PSTN between the host system and the client system according to the connection information;

suspending the data communications over the first telephone line of the PSTN between the host system and the client system in response to an on-hook to off-hook transition on the first telephone line, a telephony mode occurring during an off-hook condition.

* * * * *

UNITED STATES PATENT AND TRADEMARK OFFICE
CERTIFICATE OF CORRECTION

PATENT NO.   : 6,330,235 B1
DATED        : December 11, 2001
INVENTOR(S)  : Peter D. Olson, Kevin P. Grundy and John K. Seamons It is certified that error appears in the above-identified patent and that said Letters Patent is hereby corrected as shown below:

Drawings,
Sheet 7, Figure 7, the reference numeral -- 701 -- should be applied as a Figure label;

Column 1,
Line 45, after "communicate", insert -- with --;

Column 4,
Line 27, after "off-hook", insert -- condition --;

Column 5,
Line 35, after "telephone", insert -- call --;

Column 6,
Line 38, delete "5303" and insert -- 303 --;

Column 8,
Line 20, delete "417" and insert -- 117 --;

Column 9,
Line 27, before "607", insert -- DSP --;

Column 10,
Line 2, delete "is" and insert -- are --;

Column 11,
Line 35, delete the second appearance of "the" and insert -- a --;

Column 13,
Line 54, delete the second appearance of "the" and insert -- a --;

UNITED STATES PATENT AND TRADEMARK OFFICE
CERTIFICATE OF CORRECTION

PATENT NO.    : 6,330,235 B1
DATED         : December 11, 2001
INVENTOR(S)   : Peter D. Olson, Kevin P. Grundy and John K. Seamons It is certified that error appears in the above-identified patent and that said Letters Patent is hereby corrected as shown below:

Column 14,
Line 7, delete the first appearance of "the" and insert -- a --; and
Lines 13-15, delete "; and a detection circuit coupled to the first telephone line".

Signed and Sealed this

Eighth Day of April, 2003

JAMES E. ROGAN
*Director of the United States Patent and Trademark Office*